Figure 1:
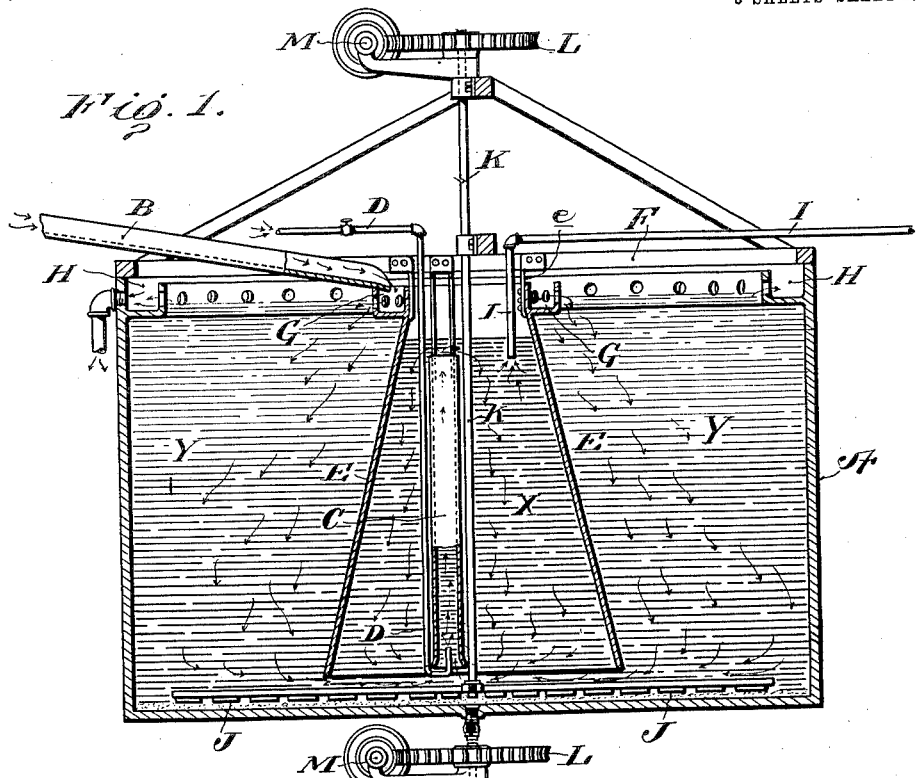

J. VAN N. DORR.
APPARATUS FOR THICKENING AND AGITATING PULP.
APPLICATION FILED SEPT. 9, 1912.

1,076,666.

Patented Oct. 28, 1913.

3 SHEETS—SHEET 1.

Witnesses

Inventor
J. V. N. Dorr
by his Attorneys

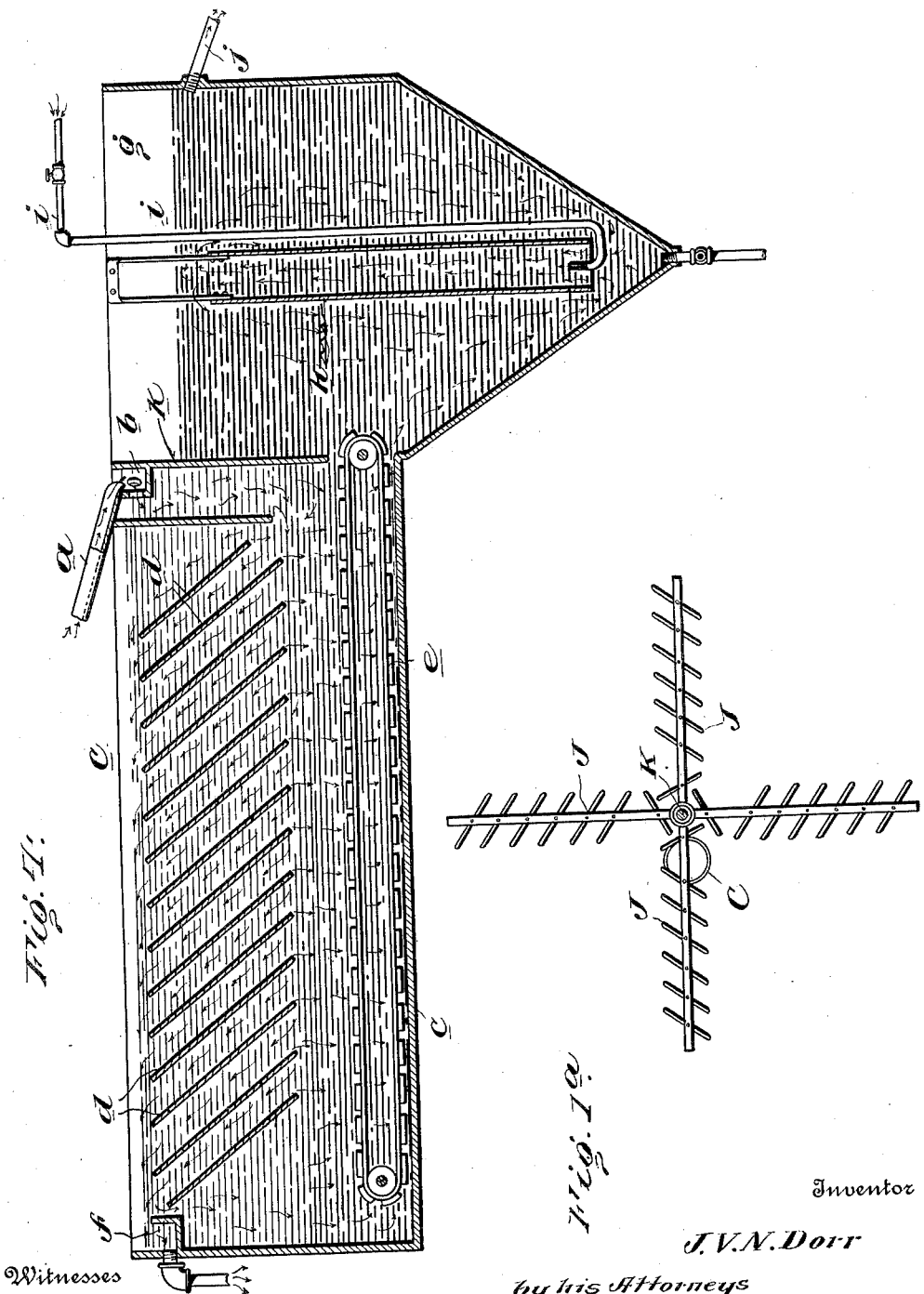

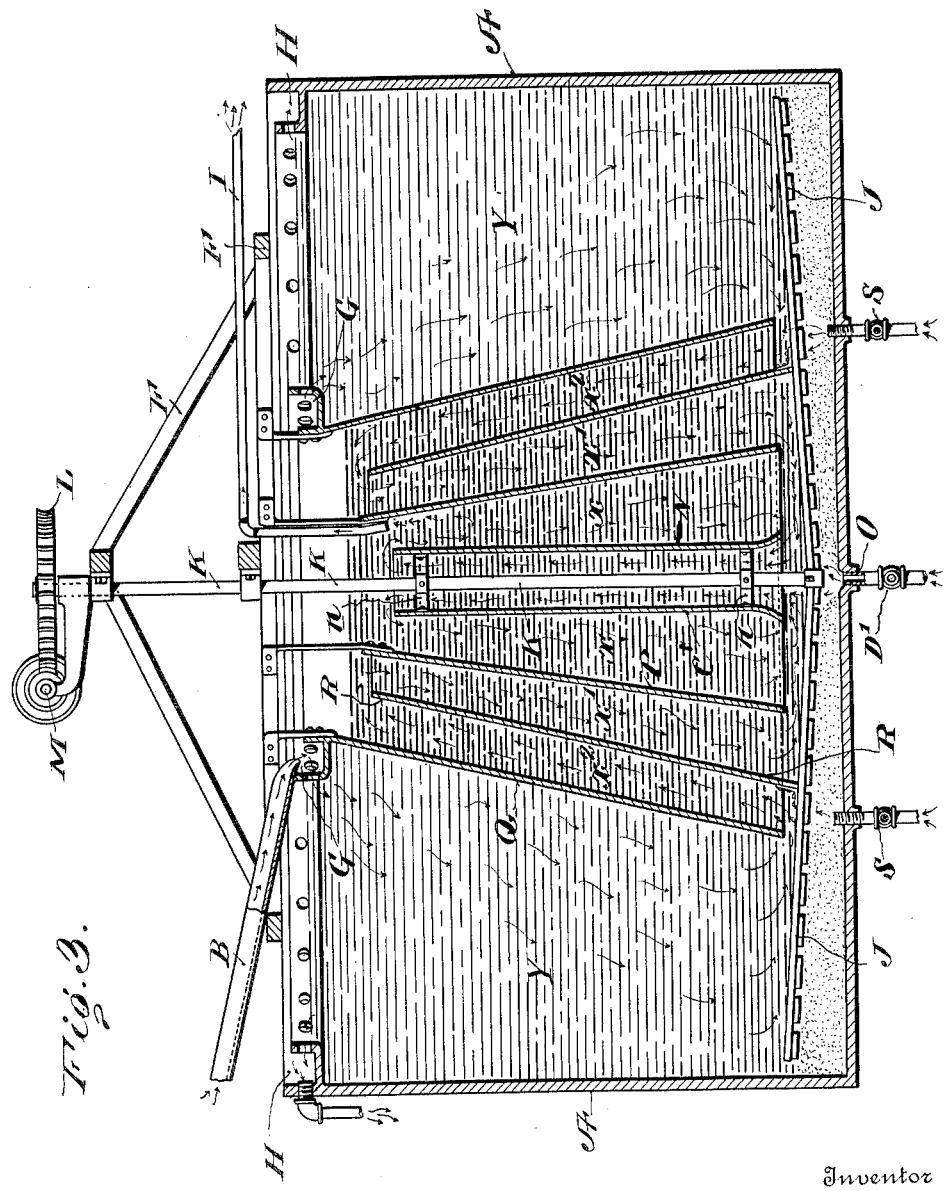

UNITED STATES PATENT OFFICE.

JOHN VAN NOSTRAND DORR, OF DENVER, COLORADO.

APPARATUS FOR THICKENING AND AGITATING PULP.

1,076,666.

Specification of Letters Patent.

Patented Oct. 28, 1913.

Application filed September 9, 1912. Serial No. 719,465.

*To all whom it may concern:*

Be it known that I, JOHN VAN NOSTRAND DORR, a citizen of the United States, residing in Denver, in the county of Denver and State of Colorado, have invented certain new and useful Improvements in Apparatus for Thickening and Agitating Pulp, of which the following is a specification.

This invention relates to apparatus for dewatering and agitating solids suspended in liquids, such as ore pulp as it comes from the crushers or grinders.

In the treatment of any solid for the purpose of dissolving one or more of its constituents, as in the treatment of ore by the cyanid process, it is customary to remove by decantation a large part of the water or solution, in which the ore is suspended, as it comes from the grinding or pulverizing machines in order to reduce the pulp to the proper density for agitation or for filtration, and after such dewatering it is customary to agitate the thickened pulp until the dissolution of soluble material has been effected, the solvent liquor being then further treated to recover its values. Decantation and dilution are also used as means for recovering the dissolved constituents after solution has taken place. Continuous decantation, both ahead of and after agitation, for the recovery of the dissolved values has now come into general use.

Heretofore the steps of decantation and agitation have been performed in separate vessels, but according to my invention they are carried on simultaneously, and under the most favorable conditions resulting in economy in the first cost of the apparatus and the expense of its maintenance.

In carrying out my invention I provide a tank or container to which the thin pulp from the mill is delivered and which is provided with an outlet for the thickened pulp and an overflow for the clear liquor containing the values in solution. The solid particles of the pulp settle to the lower part of the container and means is provided for lifting the settled material to a higher level where it overflows and passes down to the lower part of the container and is again lifted, this operation being repeated until the desired dissolution is effected.

The means for lifting the settled material preferably consists of what is known in this art as an "air-lift" and comprises a vertically arranged pipe or cylinder to the lower end of which air under pressure is delivered and which, as it rises, carries the settled material to the upper part of the container.

In order to divide that part of the pulp being agitated from that part which slowly settles, I provide a separator which is preferably in the form of a truncated cone which surrounds the air-lift and provides a space down which the material being agitated passes to the mouth of the lifter.

In order to scour the settled material to break up and remove insoluble matter from the particles thereof and to move the material into the field of action of the agitator, I provide slowly revolving plows or scrapers which operate on the settled material near the bottom of the container. Two or more cones or separators may be employed to provide a plurality of agitating spaces, and a plurality of air-lifts may be used in connection with them.

In the accompanying drawings I have shown apparatus which may be employed for carrying out my invention.

Figure 2:
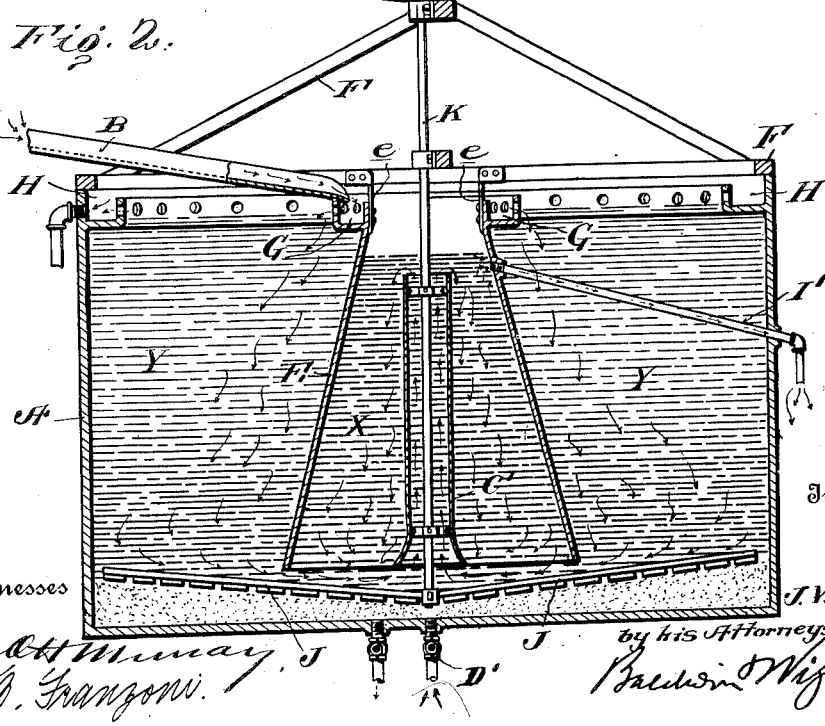

Figure 1 shows a vertical central section through a combined thickener and agitator embodying my improvements. Fig. 1ª shows a plan view of the scrapers preferably employed. Fig. 2 shows a vertical central section through a combined thickner and agitator of modified construction. Fig. 3 shows a vertical central section through an apparatus in which a plurality of separators and air-lifts are employed. Fig. 4 is a vertical central section through an apparatus embodying my improvements in a somewhat different organization.

In Fig. 1 of the drawings the container for the pulp under treatment is in the form of a circular tank A to which the thin pulp from the mill is delivered by a conductor B. The tank has a substantially flat bottom in contradistinction to an abruptly tapered or cone shaped bottom of the usual kind to which there are grave objections owing to the building up of the settled material thereon. The lifter for the settled material consists preferably of a vertically arranged pipe or cylinder C open at top and bottom, its lower end or mouth being a short distance above the bottom of the tank, while its upper end is in the upper portion thereof. Air is admitted to the mouth of the cylinder from a pipe D leading to any suitable source of supply. Surrounding the air-lift is a separator E, the function of which is to provide an agitating space X apart from the settling space Y. The separator is preferably in the form of a truncated cone suspended or supported in any suitable way, as by means of hangers, $e$ depending from a top frame F. The upper end of this separator preferably carries the feed launder G from which the thin pulp flows, in the manner indicated by arrows, to the surrounding space Y. The overflow launder for the clear liquor containing the values is indicated at H and the discharge for the thickened material is indicated at I. In order to scour the settled material to break up and dislodge insoluble matter and to move the settled material toward the mouth of the lifter, I employ slowly revolving plows or scrapers J comprising radial arms carrying flights so disposed as to move the material to the mouth of the lifter. The scraper arms may be arranged horizontally or substantially so, or may be inclined upwardly to some extent from their inner ends outwardly. These arms are attached to a vertical shaft K carrying a worm wheel L operated by a worm M. As the pulp comes from the mill it enters the feed launder G and passes therefrom to the settling area Y where the solid matter slowly descends while the clear liquor passes out through the overflow launder H. The settled material is moved slowly in the lower part of the container toward the lifter, being thereby scoured and broken up while so moving. The air-lift causes the thickened material to rise in the lifter pipe where it is thoroughly aerated and from the top of this pipe the material overflows and settles or descends in the agitating space X within the separator E. Many of the particles of the thickened pulp are repeatedly carried up through the lifter pipe and repeatedly descend in the agitating space being thus repeatedly subjected to the influence of the dissolving fluid, and this operation takes place without interference with quiet settling in the space Y surrounding the separator. The heavier particles descend more rapidly than the lighter ones and more frequently traverse the agitating and scouring fields, while the thickened material, which is withdrawn, passes through the discharge pipe I and is delivered for further treatment. These operations may be performed continuously, the thin pulp being fed at B and the thickened and agitated pulp discharged at I.

In Fig. 2 the apparatus shown is of substantially the same construction as that illustrated in Fig. 1 and similar parts are similarly lettered. In this case, however, the air pipe D' delivers through the bottom of the tank and the lifter pipe C' is concentric with the axis of the scraper operating shaft. The discharge pipe I' in this case is inclined downwardly and delivers by gravity.

In Fig. 3 the apparatus shown is similar to that illustrated in Figs. 1 and 2, but embodies concentric separators and a plurality of air-lifts. The centrally arranged air-lift comprises the lifter pipe N which surrounds the shaft K of the scrapers and the air pipe O delivering through the bottom of the container. The lifter pipe is supported in any suitable way, as by means of spiders $n$ attached to the shaft K. The inner separator P is suspended from the top frame F and the outer separator Q is in like manner suspended. Between the two separators is arranged a divider R of truncated form larger in diameter than the inner one. It may be supported on the scraper arms as indicated. In this way a plurality of agitating spaces $x$, $x'$, $x^2$ is produced. Air is directed upwardly to the central lifter pipe C' through the pipe D' and to the space $x^2$ from the pipes S. In this way a larger field of agitation is provided, the settled material being carried up through the pipe C' and down through the space $x$ and up the space $x^2$ and down through the space $x'$. It is also obvious that some of the material which has traversed the spaces $x'$, $x^2$ will also traverse the space $x$ and the interior of the lifter pipe and vice versa. In this case also the settling area Y is not disturbed during the agitation but the solid material from the incoming thin pulp is allowed to quietly precipitate.

In Fig. 4 the form of the apparatus is different in detail from that heretofore described, but it contains my improvements and the principles of operation are similar. In this case the pulp is delivered at $a$ to a feed launder $b$ whence it flows to a settling tank $c$ provided with a series of baffle plates $d$ which arrest the solid particles and deliver them to the lower part of the tank where they are operated upon by a slowly moving conveyer $e$ which carries them to the field of agitation. The clear liquor overflows to a launder $f$. The agitating operation is performed in a container $g$ provided with an air-lift pipe $h$ to the lower end of which air is admitted from a pipe $i$. The settled material delivered by the conveyer gravitates toward the mouth of the lifter pipe and is carried up through the pipe by the ascending air and it overflows the top of the pipe from which it descends, in the manner indicated by the arrows, to be again lifted and aerated. As the operation continues the particles of the pulp are repeatedly subjected to the influence of the dissolving fluid. The treated material may be discharged from the container $g$ in any suitable way, such as by a discharge pipe $j$. It will be observed that the container *g* is separated from the tank *c* by a partition *k* which performs a function similar to the separators hereinbefore described allowing a space for agitation of the thickened pulp and a separate space for the quiet settling of the thin pulp.

I claim as my invention:

1. Apparatus for thickening and agitating pulp, comprising a settling vessel, means for lifting the settled material to a higher level, means for scouring the material in the lower portion of the vessel and for moving it slowly toward the lifter, and a separator having on one side an agitating area and on the other a space for quiet settling.

2. Apparatus for thickening and agitating pulp, comprising a settling vessel having a substantially flat bottom, a separator having on one side an agitating area in which the thickened pulp circulates and on the other a space for quiet settling, and mechanical devices moving slowly in the lower part of the settling vessel for holding the settling material in suspension and for moving it slowly toward the agitating area of the separator.

3. Apparatus for thickening and agitating pulp, comprising a settling vessel, an air lift for raising the settled material to a higher level, means for scouring the material in the lower portion of the vessel and for moving it slowly toward the air lift, and a separator having on one side an agitating area and on the other a space for quiet settling.

4. Apparatus for thickening and agitating pulp, comprising a settling vessel and a separator of truncated form open at the bottom and wider at the bottom than at the top having on one side an agitating area through which the thickened pulp circulates and on the other a space for quiet settling.

5. Apparatus for thickening and agitating pulp, comprising a settling vessel, means for lifting the settled material to a higher level, means for scouring the material in the lower portion of the vessel and for moving it slowly toward the lifters, and a series of separators in the vessel providing lifting and agitating spaces, and a space for quiet settling.

6. Apparatus for thickening and agitating pulp, comprising a settling vessel, means for lifting the settled material to a higher level, means for scouring the material in the lower portion of the vessel and for moving it slowly toward the lifters, and a series of concentric separators, for the purpose specified.

7. Apparatus for thickening and agitating pulp, comprising a settling vessel having a substantially flat bottom, means for lifting the settled material to a higher level, mechanical devices moving slowly in the lower part of the settling vessel for holding the settling material in suspension and for moving it slowly toward the lifter, and a separator having on one side an agitating area and on the other a space for quiet settling.

In testimony whereof, I have hereunto subscribed my name.

JOHN VAN NOSTRAND DORR.

Witnesses:
P. M. McHugh,
P. D. Hitch.